US012491715B2

(12) United States Patent
Watanabe

(10) Patent No.: US 12,491,715 B2
(45) Date of Patent: Dec. 9, 2025

(54) LIQUID DISCHARGE HEAD, LIQUID DISCHARGE HEAD MODULE, AND LIQUID DISCHARGE APPARATUS

(71) Applicant: Yu Watanabe, Kanagawa (JP)

(72) Inventor: Yu Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 209 days.

(21) Appl. No.: 18/364,826

(22) Filed: Aug. 3, 2023

(65) Prior Publication Data

US 2024/0075741 A1 Mar. 7, 2024

(30) Foreign Application Priority Data

Sep. 6, 2022 (JP) ................................ 2022-141558
Jun. 9, 2023 (JP) ................................ 2023-095261

(51) Int. Cl.
*B41J 2/16* (2006.01)
*B41J 2/14* (2006.01)

(52) U.S. Cl.
CPC .... *B41J 2/1433* (2013.01); *B41J 2002/14491* (2013.01); *B41J 2202/20* (2013.01)

(58) Field of Classification Search
CPC ................................ B41J 2/1433; B41J 2/162
See application file for complete search history.

(56) References Cited

U.S. PATENT DOCUMENTS 11,453,216 B2 * 9/2022 Hayashi ................. B41J 2/1433
2023/0135522 A1 5/2023 Watanabe et al.

FOREIGN PATENT DOCUMENTS

JP H04-144751 A 5/1992
JP 2003-205612 A 7/2003
JP 2020-199685 A 12/2020

OTHER PUBLICATIONS

U.S. Appl. No. 18/107,525, filed Feb. 9, 2023.
U.S. Appl. No. 18/106,512, filed Feb. 7, 2023.

* cited by examiner

*Primary Examiner* — Jason S Uhlenhake
(74) *Attorney, Agent, or Firm* — IPUSA, PLLC

(57) ABSTRACT

A liquid discharge head includes: a nozzle substrate including a nozzle, from which a liquid is discharged in a discharge direction, on a nozzle face; a chamber forming plate on a first face of the nozzle substrate and including a pressure chamber communicating with the nozzle, the first face opposite to the nozzle face in the discharge direction; and a frame holding the chamber forming plate on a second face and including a rib on each end of the frame outside the nozzle substrate in a longitudinal direction orthogonal to the discharge direction, and a leading end of the rib protruding from the second face of the frame toward the nozzle face and not protruding from the nozzle face in the discharge direction.

14 Claims, 11 Drawing Sheets

COMPARATIVE EXAMPLE

LIQUID DISCHARGE HEAD, LIQUID DISCHARGE HEAD MODULE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-141558, filed on Sep. 6, 2022 and Japanese Patent Application No. 2023-095261, filed on Jun. 9, 2023, in the Japan Patent Office, the entire disclosure of which is hereby incorporated by reference herein.

BACKGROUND

Technical Field

Embodiments of the present disclosure relate to a liquid discharge head, a liquid discharge head module, and a liquid discharge apparatus.

Related Art

A typical liquid discharge head is formed by stacking a channel substrate, which forms a liquid channel and a pressure chamber, and a nozzle substrate provided with nozzles for discharging liquid.

SUMMARY

An embodiment of the present disclosure provides a liquid discharge head includes: a nozzle substrate including a nozzle, from which a liquid is discharged in a discharge direction, on a nozzle face; a chamber forming plate on a first face of the nozzle substrate and including a pressure chamber communicating with the nozzle, the first face opposite to the nozzle face in the discharge direction; and a frame holding the chamber forming plate on a second face and including a rib on each end of the frame outside the nozzle substrate in a longitudinal direction orthogonal to the discharge direction, and a leading end of the rib protruding from the second face of the frame toward the nozzle face and not protruding from the nozzle face in the discharge direction.

An embodiment of the present disclosure provides a liquid discharge head including: a nozzle substrate including a nozzle, from which a liquid is discharged, on a nozzle face; a chamber forming plate on a first face of the nozzle substrate and including a pressure chamber communicating with the nozzle, the first face opposite to the nozzle face in a discharge direction of the nozzle substrate; and a frame holding the chamber forming plate on a second face and including a rib on each end of the frame outside the nozzle substrate in a width direction orthogonal to the discharge direction and a longitudinal direction of the frame, and a leading end of the rib protruding from the second face of the frame toward the nozzle face and not protruding from the nozzle face in the discharge direction.

An embodiment of the present disclosure provides a liquid discharge head module including multiple liquid discharge heads including the liquid discharge head described above.

An embodiment of the present disclosure provides liquid discharge apparatus including the liquid discharge head module described above; and a conveyor to convey a recording medium to the multiple liquid discharge heads.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
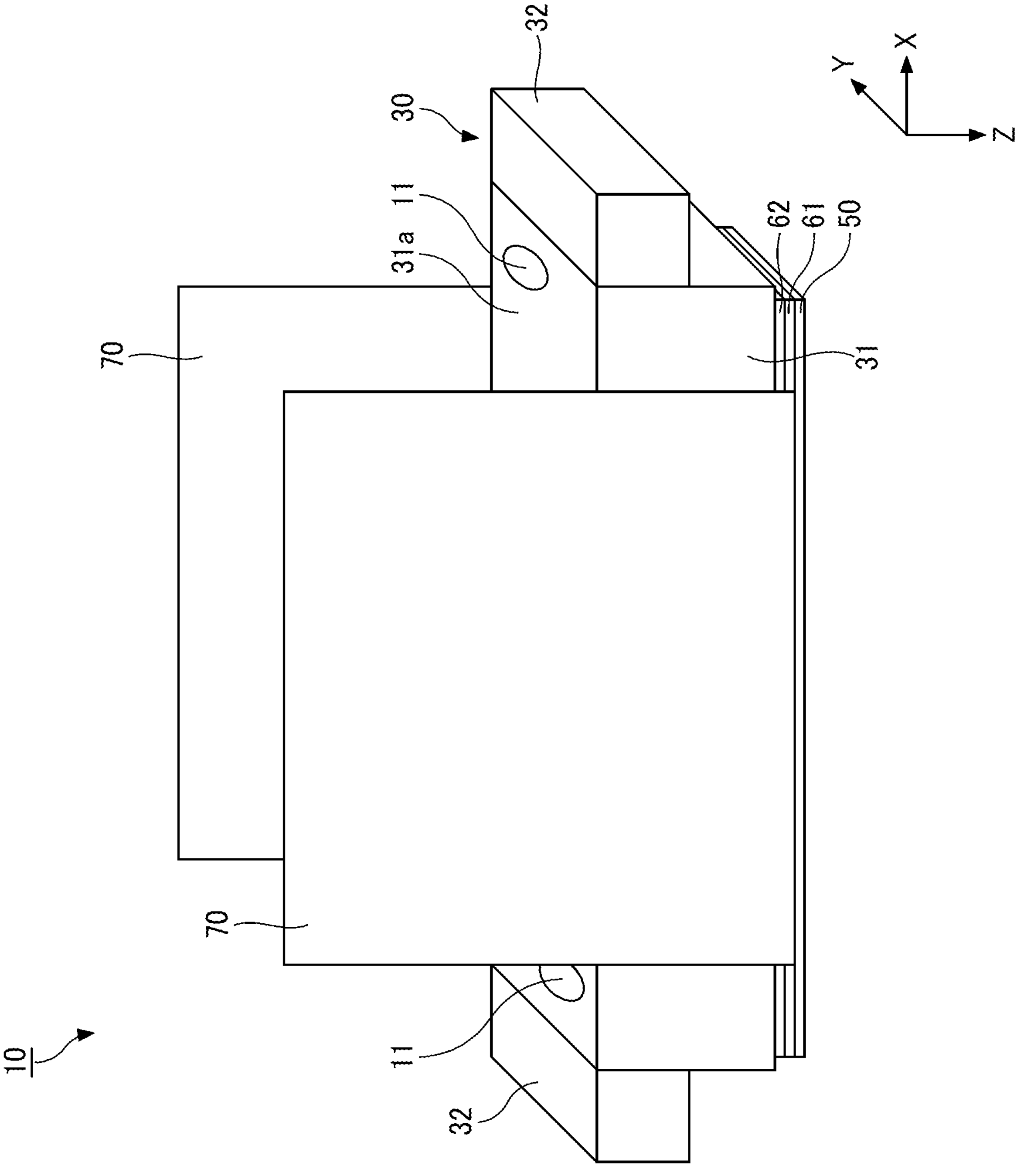
FIG. 1 is a perspective view of a liquid discharge head according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In such a typical liquid discharge head, the channel substrate has a frame member with an outer perimeter protruding downward beyond its bottom face to prevent heat dissipation from the liquid flowing through the channel to the exterior of the head.

In the liquid discharge head, however, the portion that protrudes downward is formed to encircle the nozzle substrate. This increases the overall size of the liquid discharge head, thus impeding its miniaturization.

Embodiments of the present disclosure provide a compact liquid discharge head.

A liquid discharge device, a liquid discharge head module, and a liquid discharge apparatus are described below according to embodiments of the disclosure with reference to the drawings. In drawings, three directions orthogonal to each other: an X-axis direction, a Y-axis direction, and a Z-axis direction are indicated by arrows as appropriate.

A liquid discharge head includes: a nozzle substrate including a nozzle, from which a liquid is discharged in a discharge direction, on a nozzle face; a chamber forming plate on a first face of the nozzle substrate and including a pressure chamber communicating with the nozzle, the first face opposite to the nozzle face in the discharge direction; and a frame holding the chamber forming plate on a second face and including a rib on each end of the frame outside the nozzle substrate in a longitudinal direction orthogonal to the discharge direction, and a leading end of the rib protruding from the second face of the frame toward the nozzle face and not protruding from the nozzle face in the discharge direction.

A liquid discharge head includes: a nozzle substrate including a nozzle, from which a liquid is discharged, on a nozzle face; a chamber forming plate on a first face of the nozzle substrate and including a pressure chamber communicating with the nozzle, the first face opposite to the nozzle face in a discharge direction of the nozzle substrate; and a frame holding the chamber forming plate on a second face and including a rib on each end of the frame outside the nozzle substrate in a width direction orthogonal to the discharge direction and a longitudinal direction of the frame, and a leading end of the rib protruding from the second face of the frame toward the nozzle face and not protruding from the nozzle face in the discharge direction.

Liquid Discharge Head According to the First Embodiment

Figure 2:
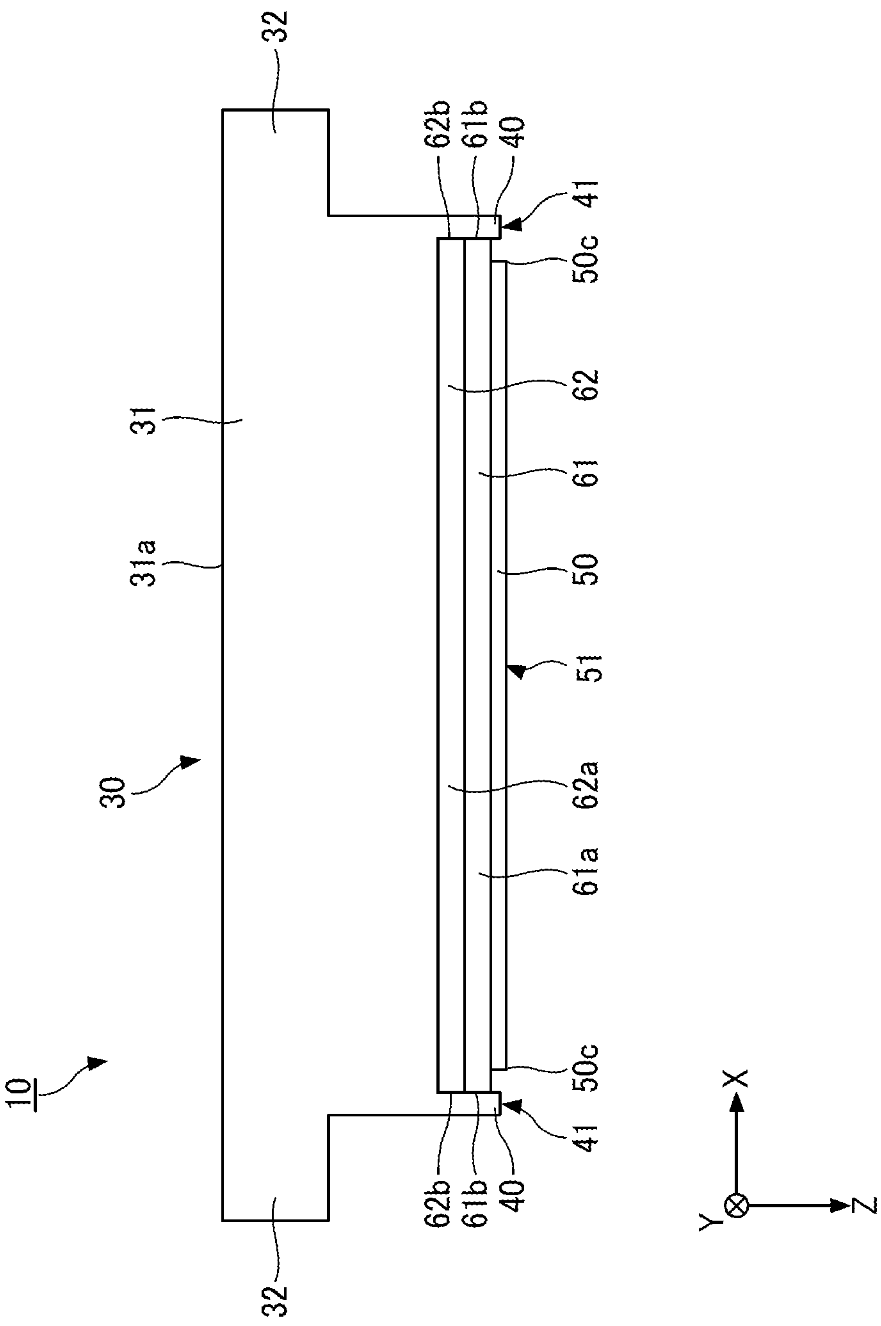
FIG. 2 is a side view of the liquid discharge head in FIG. 1.
Figure 3:
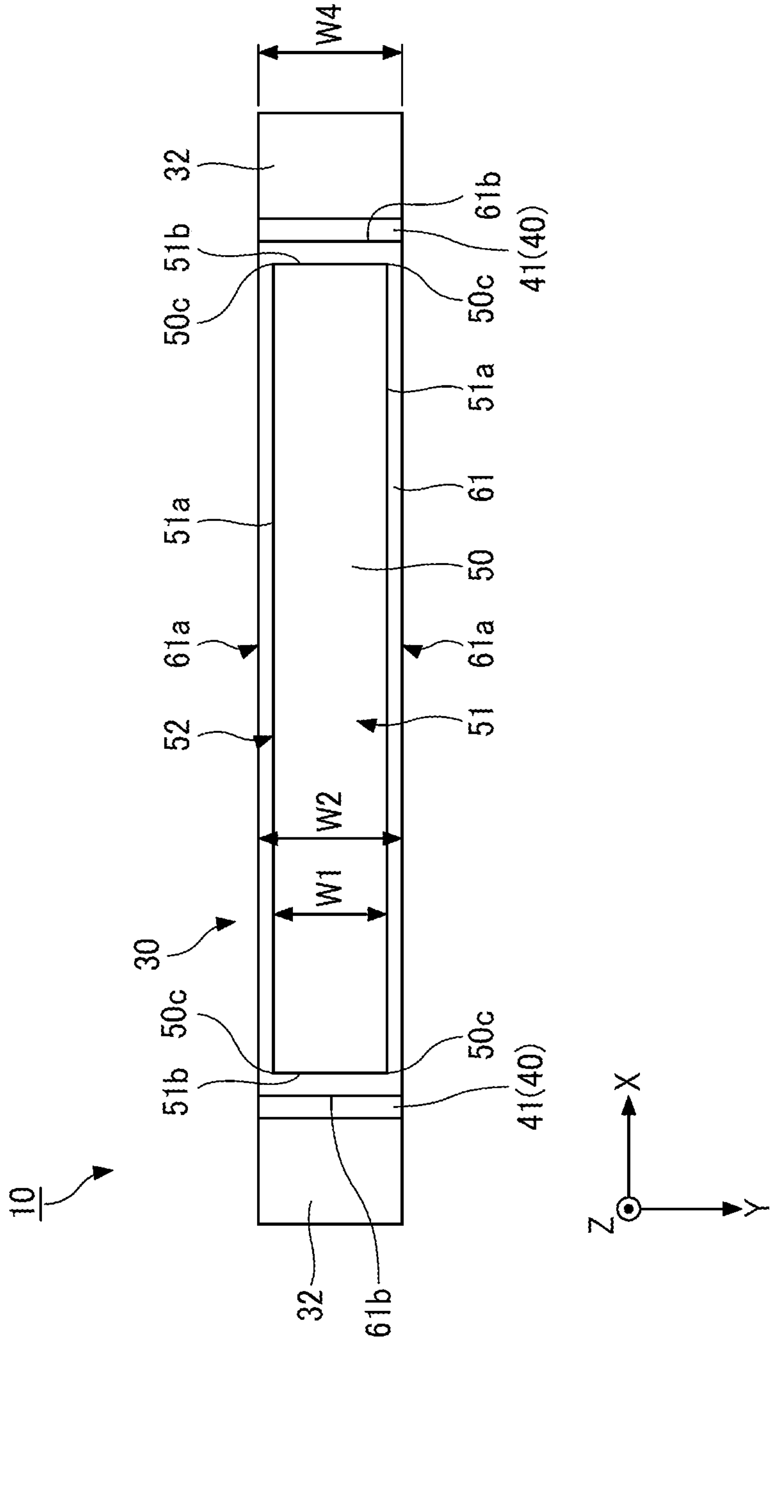
FIG. 3 is a bottom view of the liquid discharge head FIG. 1.
Figure 4:
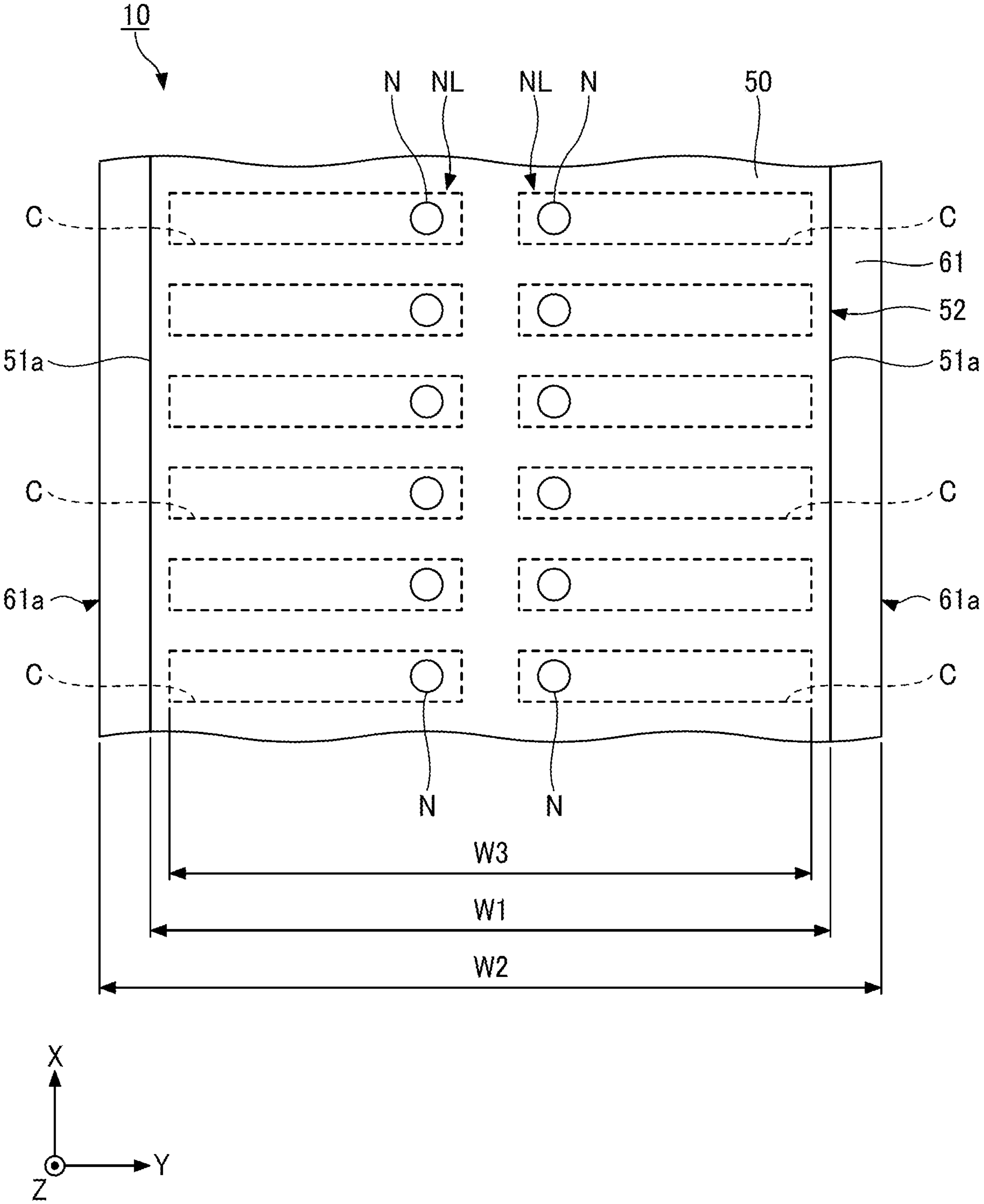
FIG. 4 is an enlarged bottom view of a nozzle face of a liquid discharge head according to an embodiment of the present disclosure.
Figure 5:
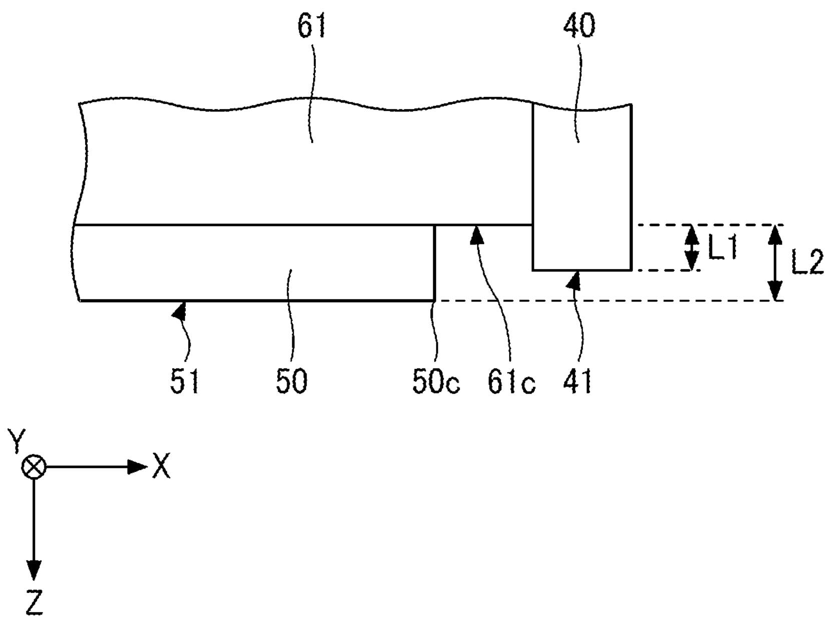
FIG. 5 is an enlarged side view of the arrangement of a pressure chamber forming plate, a nozzle substrate, and the end of the rib.
Figure 6:
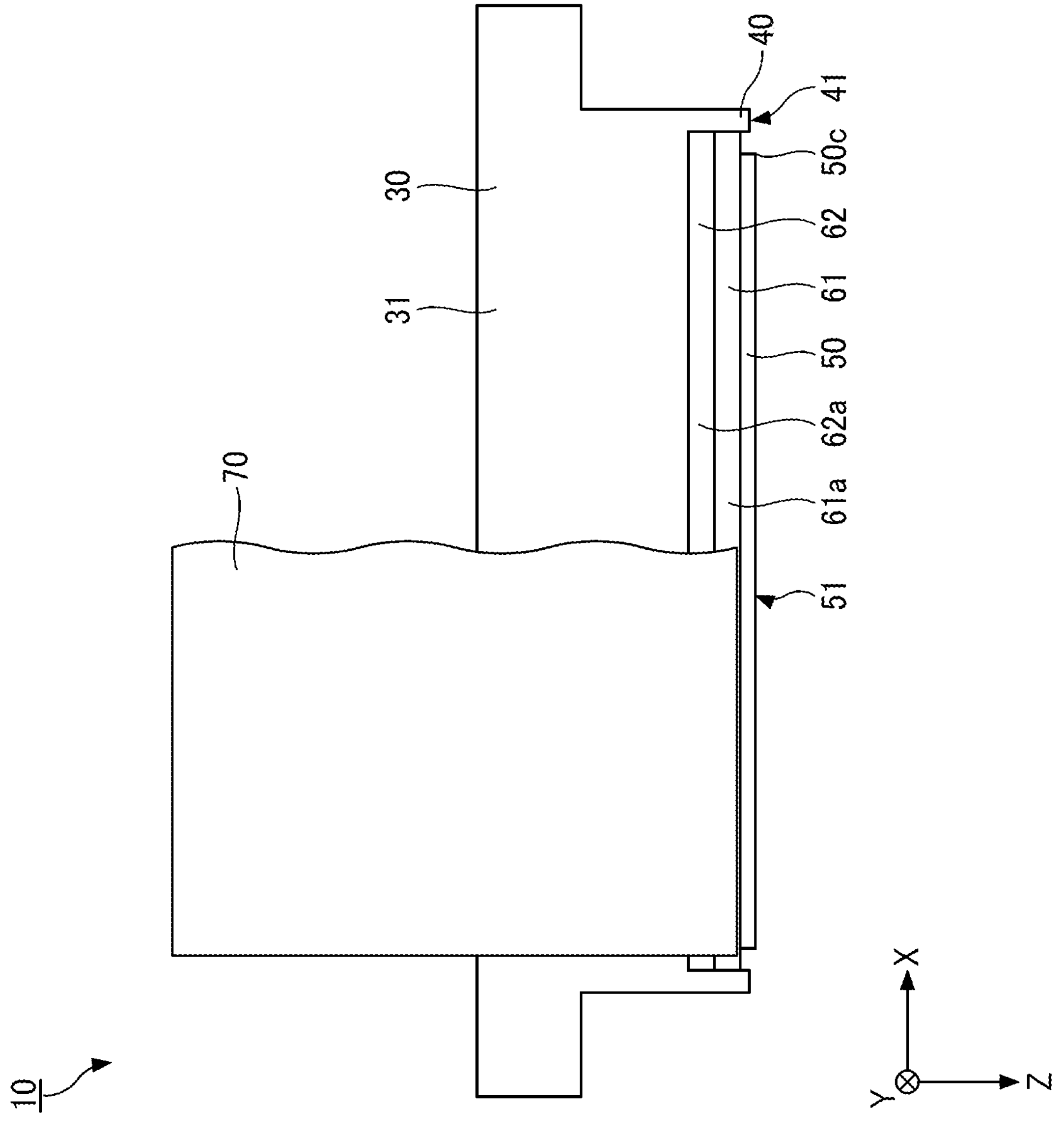
FIG. 6 is a side view of the liquid discharge head in FIG. 1, illustrating a part of a circuit board covering the side face of the pressure chamber forming plate.

A liquid discharge head 10 according to the first embodiment is described with reference to FIGS. 1 to 6. FIG. 1 is a perspective view of a liquid discharge head according to the first embodiment. FIG. 2 is a side view of the liquid discharge head according to the first embodiment. FIG. 3 is a bottom view of the liquid discharge head according to the first embodiment. FIG. 4 is an enlarged bottom view of a nozzle face of the liquid discharge head. FIG. 5 is an enlarged side view of the arrangement of a pressure chamber forming plate, a nozzle substrate, and the end of the rib. FIG. 6 is a side view of the liquid discharge head, illustrating a circuit board covering the side face of the pressure chamber forming plate.

As illustrated in FIGS. 1 to 3, the discharge head 10 (i.e., the liquid discharge head) includes a nozzle substrate 50, pressure chamber forming plates 61 and 62, and a frame 30. The discharge head 10 discharges ink that serves as liquid.

Nozzle Substrate

As illustrated in FIG. 3, the nozzle substrate 50 has a rectangular plate shape. The nozzle substrate 50 has a pair of long sides 51*a* and a pair of short sides 51*b*. The outer shape 52 of the nozzle substrate 50 includes the pair of long sides 51*a* and the pair of short sides 51*b*. The pair of long sides 51*a* extend in the X-axis direction and are separated from each other in the Y-axis direction. The pair of short sides 51*b* extend in the Y-axis direction and are separated from each other in the X-axis direction.

As illustrated in FIG. 4, multiple nozzles N are formed on the nozzle face 51. The multiple nozzles N are arranged in the X-axis direction so as to form a nozzle array NL. Multiple nozzle arrays NL are separated from each other in the Y-axis direction. The nozzle substrate 50 may be formed of, for example, silicon. The nozzle substrate 50 may be formed of stainless steel, or may be formed of other materials.

Pressure Chamber Forming Plate

As illustrated in FIG. 2, the discharge head 10 includes a multiple pressure chamber forming plates 61 and 62.

The pressure chamber forming plates 61 and 62 are stacked on the surface of the nozzle substrate 50 opposite to the nozzle face 51 in the thickness direction of the nozzle substrate 50. A channel through which ink flows is formed in the pressure chamber forming plates 61 and 62. Openings and grooves forming a channel are formed in the pressure chamber forming plate 61. As illustrated in FIG. 4, multiple pressure chambers (liquid chambers) C are formed in the pressure chamber forming plates 61 and 62. The pressure chambers C is connected to the nozzles N. The discharge head 10 may have a diaphragm plate (diaphragm membrane) that forms one surface of the pressure chamber C. The multiple pressure chamber forming plates 61 and 62 and the nozzle substrate 50 are bonded to each other, for example. The thickness direction of the pressure chamber forming plates 61 and 62 and the nozzle substrate 50 is aligned with the Z-axis direction. The pressure chamber forming plate 62 is stacked on the side opposite to that of the nozzle substrate 50 with respect to the pressure chamber forming plate 61 in the Z-axis direction.

As illustrated in FIGS. 2 and 3, the pressure-chamber forming plate 61 has a first end face 61*a* and a second end face 61*b*. The first end face 61*a* is a surface along the XZ plane, and the second end face 61*b* is a surface along the YZ plane. The first end face 61*a* is disposed along the long side 51*a* of the nozzle substrate 50. The second end face 61*b* is disposed along the short side 51*b* of the nozzle substrate 50. When viewed in the Z-axis direction (i.e., in the XY plane), the first end face 61*a* is outside the long side 51*a* of the nozzle substrate 50 in the Y-axis direction. When viewed in the Z-axis direction (i.e., in the XY plane), the second end face 61*b* is outside the short side 51*b* of the nozzle substrate 50 in the X-axis direction. When viewed in the Z-axis direction (i.e., in the XY plane), "inside" and "outside" are defined with respect to the nozzle substrate 50 as follows. The "inside" refers to an area closer to the center of the nozzle substrate 50 than to the outer edge of the nozzle substrate 50, whereas the "outside" refers to an area further away from the center of the nozzle substrate 50 than the outer edge of the nozzle substrate 50.

As illustrated in FIG. 2, the pressure chamber forming plate 62 has a first end face 62*a* and a second end face 62*b*. The first end face 62*a* is a surface along the XZ plane, and the second end face 62*b* is a surface along the YZ plane. The first end face 62*a* is disposed along the long side 52*a* of the nozzle substrate 50. The second end face 61*b* is disposed along the short side 52*b* of the nozzle substrate 50. When viewed in the Z-axis direction (i.e., in the XY plane), the first end face 62*a* is outside the long side 52*a* of the nozzle substrate 50 in the Y-axis direction. When viewed in the Z-axis direction (i.e., in the XY plane), the second end face 62*b* is outside the short side 52*b* of the nozzle substrate 50 in the X-axis direction.

Actuator

The discharge head 10 includes an actuator that serves as a driving element for changing the pressure of the ink in the pressure chamber C. The actuator includes, for example, a piezoelectric element. For example, the vibrations caused by the actuator are transmitted to the ink within pressure chamber C through the diaphragm, causing the pressure of the ink to fluctuate. The discharge head 10 fluctuates the pressure of the ink within the pressure chamber, discharging the ink from the nozzle N. The actuator may include a driving element different from the piezoelectric element.

Frame

As illustrated in FIG. 2, the frame 30 holds the pressure chamber forming plates 61 and 62. The frame 30 includes a body 31 disposed on the pressure chamber forming plates 61 and 62, a flange 32 protruding from the body 31, and ribs 40 protruding downward from the body 31. In the Z-axis direction, a direction from the body 31 toward the nozzle substrate 50 is referred to as "down", and a direction from the nozzle substrate 50 toward the body 31 is referred to as "up". The ribs 40 are made of resin, for example. The ribs 40 may be formed of metal.

A channel through which ink flow is formed in the interior of the body 31. The internal channel of the body 31 is connected to the internal channels of the pressure chamber forming plates 61 and 62. An ink supplying port 11 that is connected to the channel in the interior of the body 31 is formed in the top surface 31*a* of the body 31. The ink supplied from the ink supply port 11 flows through the internal channel of the body 31 and continues through the internal channels of the pressure chamber forming plates 61 and 62. Thus, the ink is delivered to the pressure chamber C.

The flange 32 protrudes outward from the body 31 in the X-axis direction. The flange 32 is formed so as to protrude outward from the pressure chamber forming plates 61 and 62 and the nozzle substrate 50 in the X-axis direction.

Rib

The pair of ribs 40 is a part of the frame 30. The pair of ribs 40 protrudes from the body 31 of the frame 30 in a direction approaching the nozzle face 51 of the nozzle substrate 50 in the Z-axis direction. As illustrated in FIG. 3, the ribs 40 are separated from each other in the X-axis direction (i.e., the longitudinal direction of the nozzle substrate 50, or the first direction). The pair of ribs 40 is disposed along the Y-axis direction (i.e., the lateral direction orthogonal to the longitudinal direction of the nozzle substrate 50, the second direction). The ribs 40 are separated from the short side 51*b* that is closer to the ribs 40 out of the two short sides 51*b* of the nozzle substrate 50 in the X-axis direction. Gap is formed between the ribs 40 and the short side 51*b* closer to the ribs 40 out of the two short sides 51*b*.

The liquid discharge head according to an embodiment of the present disclosure further has a gap between the nozzle substrate and the rib in the longitudinal direction.

The pair of ribs 40 is formed only on the outside of the nozzle substrate 50 in the X-axis direction when viewed in the Z-axis direction (i.e., in the XY plane). The ribs 40 are not formed outside the nozzle substrate 50 in the Y-axis direction.

The ribs 40 are formed so as to cover the second end faces 61*b* and 62*b* of the pressure chamber forming plates 61 and 62. The ribs 40 cover the second end faces 61*b* and 62*b* from the outside in the X-axis direction. The ribs 40 do not cover the first end faces 61*a* and 62*a* of the pressure chamber forming plates 61 and 62.

The relative position between the tip portion of the rib and the nozzle face

As illustrated in FIG. 5, the end face 41 (i.e., leading end, or the tip portion) of each rib 40 is closer to the bottom surface 61*c* of the pressure chamber forming plate 61 than the nozzle face 51 of the nozzle substrate 50 in the Z-axis direction. The bottom surface 61*c* of the pressure-chamber forming plate 61 is closer to the nozzle substrate 50 out of the two opposed surfaces of the pressure chamber forming plate 61 in its thickness direction. In the Z-axis direction, a length L1 between the bottom surface 61*c* of the pressure chamber forming plate 61 and the end face 41 of each rib 40 is shorter than a length L2 between the bottom surface 61*c* and the nozzle face 51. In the Z-axis direction, the end face 41 of each rib 40 does not protrude from the nozzle face 51.

Nozzle Substrate Width

As illustrated in FIG. 4, width W1 of the nozzle substrate 50 is narrower than width W2 of the pressure chamber forming plate 61. The width W1 of the nozzle substrate 50 is a length between the pair of long sides 51*a* in the Y-axis direction of the nozzle substrate 50. The width W2 of the pressure chamber forming plates 61 is a length between the pair of first end faces 61*a* in the Y-axis direction of the pressure chamber forming plate 61. The width W1 of the nozzle substrate 50 is larger than the width W3 of the area of the pressure chamber forming plate 61 where the pressure chambers C are formed in the Y-axis direction. The width W3 of the area where the pressure chambers C are formed is a length between the outer edges (i.e., the inner wall surfaces) of the pressure chambers C. The pressure chambers C are not formed outside the width W3 in the Y-axis direction.

Rib Width

As illustrated in FIG. 3, the width W4 of the rib 40 is larger than the width W1 of the nozzle substrate 50.

The width W4 of each rib 40 is a length of each rib 40 in the Y-axis direction. The width W4 of each rib 40 is the same as the width W2 of the pressure chamber forming plates 61. In the present embodiment, the "same" includes the meaning of substantially the same. The term "substantially the same" is intended to mean that a difference of about ⅕ or less of the width W1 is allowed. The width W4 of each rib 40 may be a length of the end face 41 of each rib 40 in the Y-axis direction. The ribs 40 are formed to be continuous in the Y-axis direction. The ribs 40 are formed so as to continue to the outside of the corner 50*c* of the nozzle substrate 50 in the Y-axis direction. The corner 50*c* of the nozzle substrate 50 is a corner at which the long side 51*a* and the short side 51*b* of the nozzle face 51 intersect when viewed in the Z-axis direction (i.e., in the XY plane).

FPC

As illustrated in FIGS. 1 and 6, the discharge head 10 includes a flexible printed circuit (FPC) 70 which is a flexible wiring board. The FPC 70 is electrically connected to the actuator (piezoelectric element). A drive integrated circuit (IC) for driving the actuator is mounted on the FPC 70. The drive IC outputs a drive waveform to the actuator.

The FPC 70 is disposed to cover the first end faces 61*a* and 62*a* of the pressure chamber forming plates 61 and 62. The first end faces 61*a* and 62*a* are side faces disposed at positions where the ribs 40 are not formed. The FPC 70 is disposed to cover a side face of the body 31 of the frame 30 in the Y-axis direction.

The liquid discharge head according to an embodiment of the present disclosure, further includes a wiring board covering a longitudinal side face of the chamber forming plate.

Effects of Discharge Head of the First Embodiment

In the discharge head 10 according to the first embodiment, a frame 30 includes ribs 40 protruding in a direction approaching the nozzle substrate 50 in the thickness direction of the nozzle substrate 50. The ribs 40 are formed only outside the nozzle substrate 50 in the first direction parallel to the longitudinal direction of the nozzle substrate 50 when viewed in the thickness direction of the nozzle substrate 50 (i.e., in the XY plane).

In the liquid discharge head according to an embodiment of the present disclosure, the rib 40 is outside the nozzle substrate in the longitudinal direction and extending in a width direction orthogonal to the discharge direction and the longitudinal direction.

The discharge head 10 according to the first embodiment, ribs 40 are formed only outside the nozzle substrate 50 in the X-axis direction. No ribs are formed outside the nozzle substrate 50 in the Y-axis direction. This arrangement enables a narrower width of the discharge head 10 in the Y-axis direction. This allows for a reduction in the outer dimension of the discharge head 10, unlike a comparative example with a rib formed outside a discharge head in its Y-axis direction. The frame 30 including a pair of ribs 40 enhances stiffness. The framed 30 with the enhanced stiffness can stably hold the pressure chamber forming plates 61 and 62 and the nozzle substrate 50. In the discharge head 10 according to the present embodiment, the ribs 40 may be provided on both sides of the nozzle substrate 50 in the X-axis direction, or may be provided only on one side of the nozzle substrate 50.

In the discharge head 10 according to the present embodiment, the ribs 40 are disposed only outside the nozzle substrate 50 in the X-axis direction, each continuously extending in the Y-axis direction when viewed in the Z-axis direction (i.e., in the XY plane).

In the discharge head 10 of such a configuration, the ribs 40 continuously extending in the Y-axis direction cover the first end faces 61*a* of the pressure chamber forming plates 61 and 62. This allows for the protection of the pressure chamber forming plates 61 and 62.

The ribs 40 of the discharge head 10 are formed continuously extending to the outside of the corners 50*c* of the nozzle substrate 50 in the Y-axis direction. This allows for the protection of the corners 50*c* of the nozzle substrate 50.

This reduces the possibility that another object outside the discharge head 10 might hit the corners 50*c* of the nozzle substrate 50. Thus, damage to the corners 50*c* of the nozzle substrate 50 is minimized. The corner 50*c*, which is the most vulnerable parts of the nozzle substrate 50, can be protected.

In the discharge head 10, the ribs 40 protrude in the thickness direction of the pressure chamber forming plate 61 toward the nozzle substrate 50. The end faces 41 of the ribs 40 are closer to the pressure chamber forming plate 61 than the nozzle face 51 is. In the discharge head 10 with such a configuration, the end faces 41 of the ribs 40 are disposed above the nozzle face 51 and do not protrude below the nozzle face 51 in the Z-axis direction. With this arrangement, the ribs 40 do not pose any obstruction during the wiping process on the nozzle face 51. Thus, foreign matter can be prevented from adhering onto the nozzle face 51. Examples of foreign matter include paper pieces separated from paper as a printing medium and ink droplets. The wiping process is a process of cleaning the nozzle face 51 by moving, for example, a wiper relative to the nozzle face 51.

In the liquid discharge head according to an embodiment of the present disclosure, the leading end of the rib is between the first face and the nozzle face of the nozzle substrate in the discharge direction.

The discharge head 10 further includes an FPC 70 electrically connected to the actuator. The FPC 70 is disposed at a position at which the ribs 40 are not formed when viewed in the thickness direction of the nozzle substrate 50 (i.e., in the Z-axis direction, or in the XY plane). The FPC 70 covers the first end faces 61*a* and 62*a* of the pressure chamber forming plates 61 and 62.

Such a configuration of the discharge head 10 enables the first end faces 61*a* and 62*a* of the pressure chamber forming plates 61 and 62, which are not covered by the ribs 40, to be electrically connected to the electrical components. The FPC 70 does not hinder miniaturization of the discharge head 10.

In the discharge head 10, the nozzle substrate 50 is disposed so as to cover the pressure chamber C when viewed in the thickness direction of the nozzle substrate 50 (i.e., in the Z-axis direction, in the XY plane). The nozzle substrate 50 has an outer dimension (or the outer shape 52) smaller than that of the pressure chamber forming plate 61.

In such a configuration of the discharge head 10, the nozzle substrate 50 does not protrude outward from the pressure chamber forming plate 61.

In the liquid discharge head according to an embodiment of the present disclosure, the nozzle substrate covers the pressure chamber in the width direction. The nozzle substrate has an outer dimension smaller than an outer dimension of the chamber forming plate in the width direction, and the rib has a width wider than the nozzle substrate in the width direction.

Liquid Discharge Head According to the Second Embodiment

Figure 7:
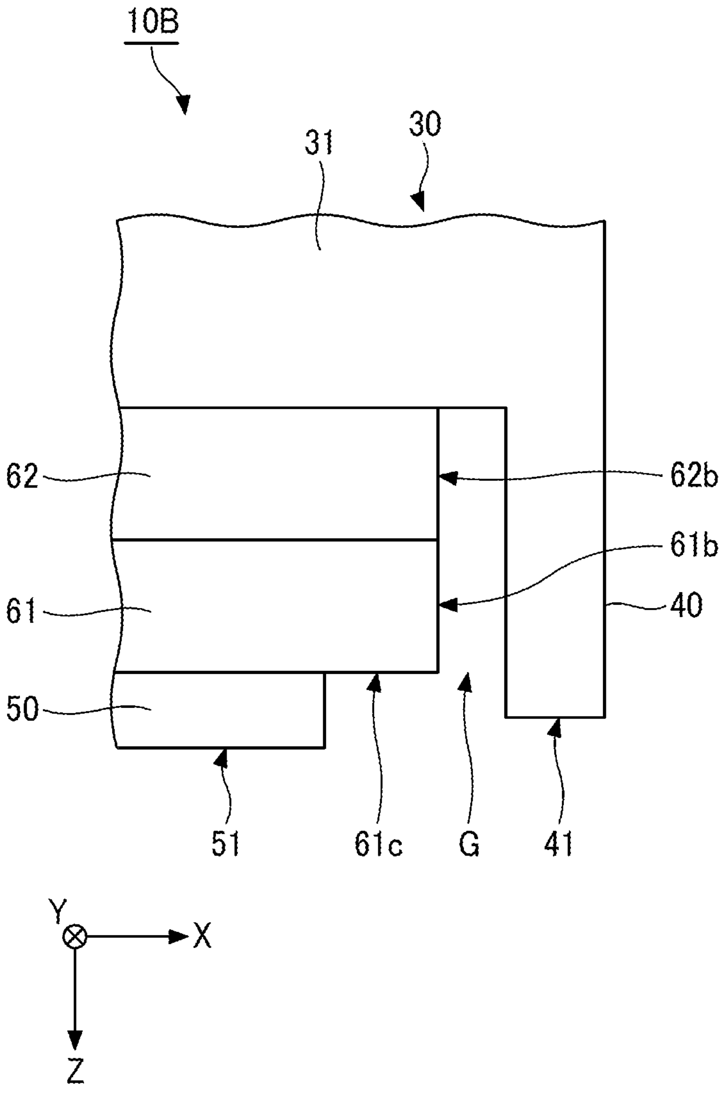
FIG. 7 is an enlarged side view of gap between ribs and second end faces of pressure chamber forming plates in a liquid discharge head according to a second embodiment.

A liquid discharge head according to the second embodiment is described below with reference to FIG. 7. FIG. 7 is an enlarged side view of gap G between ribs 40 and the second end faces 61*b* and 62*b* of the pressure chamber forming plates 61 and 62 in a liquid discharge head according to the second embodiment. The discharge head 10B according to the second embodiment differs from the discharge head 10 according to the first embodiment in that gap G is formed between the ribs 40 and the second end faces 61*b* and 62*b* of the pressure chamber forming plates 61 and 62. In the description of the second embodiment, descriptions similar to those of the first embodiment are omitted below.

In the discharge head 10B, the gap G is formed between the ribs 40 and the second end faces 61*b* and 62*b* of the pressure chamber forming plates 61 and 62 in the Y-axis direction. The gap G is filled with, for example, an adhesive. The adhesive filled in the gap G may be, for example, a thermosetting resin. The thermosetting resin can be cured by heating, enabling bonding between the nozzle substrate 50, the pressure chamber forming plates 61 and 62, and the ribs 40.

For example, a difference in linear thermal expansion occurs between the nozzle substrate 50, the pressure chamber forming plates 61 and 62, and the ribs 40 when the thermosetting resin is heated. This might cause residual stresses on the second end faces 61*b* and 62*b* of the pressure chamber forming plates 61 and 62. The gap G formed in the discharge head 10B facilitates accommodating the difference in linear thermal expansion between the pressure chamber forming plates 61 and 62 and the nozzle substrate 50, thus reducing the residual stresses. The discharge head 10B that achieves a reduction in residual stresses on the pressure chamber forming plates 61 and 62 can reduce the occurrence of strains in the nozzle substrate 50 and the pressure chamber forming plates 61 and 62. Thus, the deformation of the discharge head 10 is reduced. This stabilizes the discharge characteristics and achieves quality stabilization.

Liquid Discharge Head According to the Third Embodiment

Figure 8:
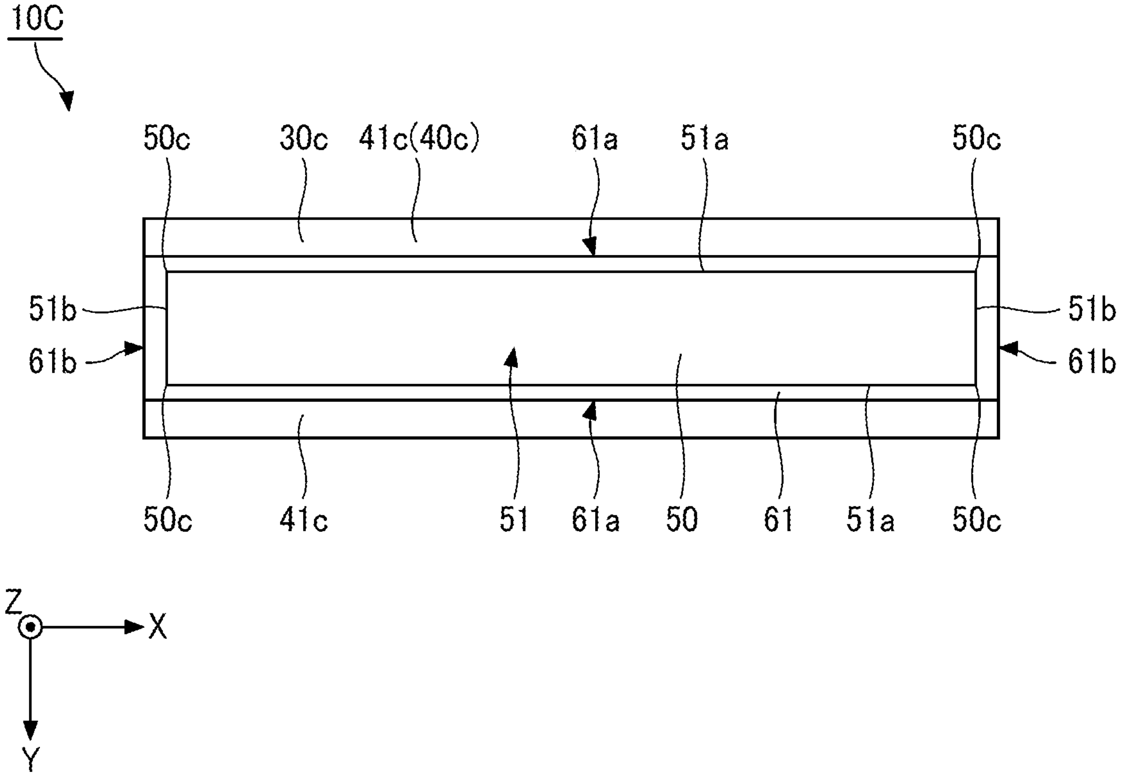
FIG. 8 is a bottom view of a liquid discharge head according to a third embodiment.

A liquid discharge head according to the third embodiment is described below with reference to FIG. 8. FIG. 8 is a bottom view of the liquid discharge head according to the third embodiment. A discharge head 10C according to the third embodiment as illustrated in FIG. 8 differs from the discharge head 10 according to the first embodiment as illustrated in FIG. 3 in that ribs 40C are arranged outside the nozzle substrate 50 in the Y-axis direction, instead of the ribs 40 disposed outside the nozzle substrate 50 in the X-axis direction in the discharge head 10 according to the first embodiment. In the description of the discharge head 10C according to the fifth embodiment, descriptions similar to those of the first and second embodiments are omitted below.

The discharge head 10C includes a frame 30C including a pair of ribs 40C. The pair of ribs 40C are separated from each other in the Y-axis direction. The ribs 40C include end faces 41C. The end face 41C is closer to the pressure chamber forming plate 61 than the nozzle face 51 of the nozzle substrate 50 in the Z-axis direction. The end face 41C does not protrude from the nozzle face 51 in the Z-axis direction.

The pair of ribs 40 is formed only on the outside of the nozzle substrate 50 in the Y-axis direction when viewed in the Z-axis direction (i.e., in the XY plane). The pair of ribs 40C is not formed on the outside of the nozzle substrate 50 in the X-axis direction when viewed in the Z-axis direction (i.e., in the XY plane). The ribs 40C are formed to be continuous in the X-axis direction. The ribs 40C are formed so as to continue to the outside of the corner 50*c* of the nozzle substrate 50 in the X-axis direction.

In the discharge head 10C, an FPC 70 may be disposed at a position at which the ribs 40C are not formed when viewed in the Z-axis direction (i.e., in the XY plane). The FPC 70 is disposed to cover the second end faces 61*b* and 62*b* of the pressure chamber forming plates 61 and 62.

The discharge head 10C according to the third embodiment exhibits similar effects to those of the discharge head 10 according to the first embodiment. In the discharge head 10C according to the present embodiment, the ribs 40C may be provided on both sides of the nozzle substrate 50 in the Y-axis direction, or may be provided only on one side of the nozzle substrate 50 in the Y-axis direction.

In the discharge head 10C according to the third embodiment, gap G may be formed between the ribs 40C and the first end faces 61*a* and 62*a* of the pressure chamber forming plates 61 and 62. The gap G may be filled with thermosetting resin.

Liquid Discharge Head Module According to the Fourth Embodiment

Figure 9:
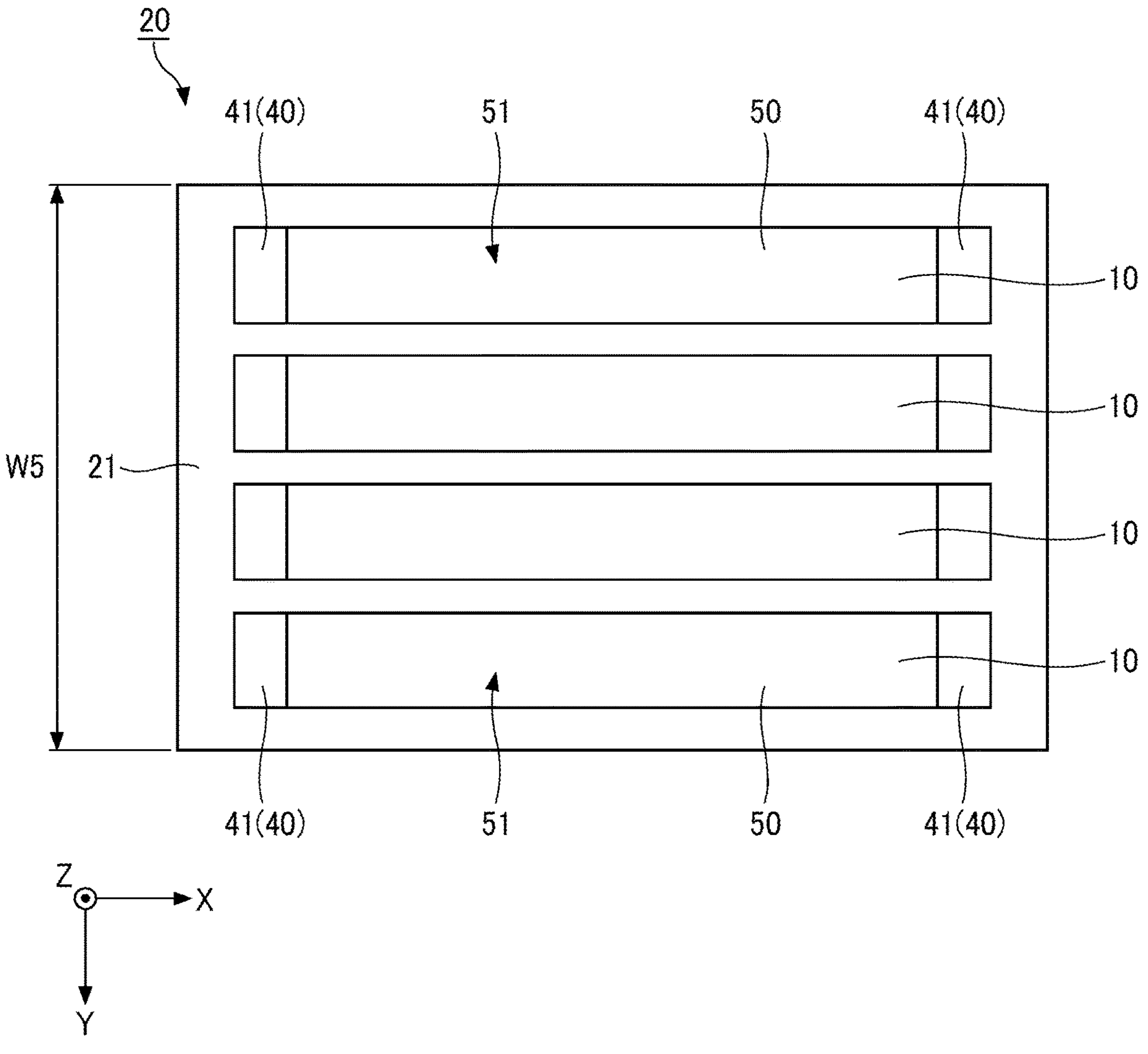
FIG. 9 is a bottom view of a liquid discharge head module according to a fourth embodiment.

A liquid discharge head according to the fourth embodiment is described below with reference to FIG. 9. FIG. 9 is a bottom view of a liquid discharge head module according to the fourth embodiment of the present disclosure. In the description of a head module 20 according to the fourth embodiment (or a liquid discharge head module), descriptions similar to those of the discharge head 10 according to the first embodiment described above are omitted below.

The head module 20 includes multiple discharge heads 10. The multiple discharge heads 10 are arranged in the Y-axis direction. The longitudinal direction of the discharge heads 10 is aligned with the X-axis direction. The head module 20 includes a holder 21 that holds the multiple discharge heads 10. The holder 21 may hold, for example, a flange 32 of the discharge heads 10.

A liquid discharge head module includes multiple liquid discharge heads including the liquid discharge head according to an embodiment of the present disclosure.

In the head module 20, ribs 40 are formed only on the outside of the nozzle substrate 50 in the X-axis direction when viewed in the Z-axis direction (i.e., the XY plane). In the head module 20, ribs 40 are not formed on the outside of the nozzle substrate 50 in the Y-axis direction when viewed in the Z-axis direction (i.e., the XY plane). In this arrangement, the head module 20 provided with the multiple discharge heads 10 has a narrow width W5 in the Y-axis direction. In other words, the head module 20 according to the present embodiment achieves miniaturization more than a typical head module.

The head module 20 may include multiple discharge heads 10B instead of multiple discharge heads 10. Alternatively, the head module 20 may include multiple discharge heads 10C.

Liquid Discharge Head Module According to Comparative Example

A liquid discharge head according to a comparative example is described below with reference to FIG. 10.

Figure 10:
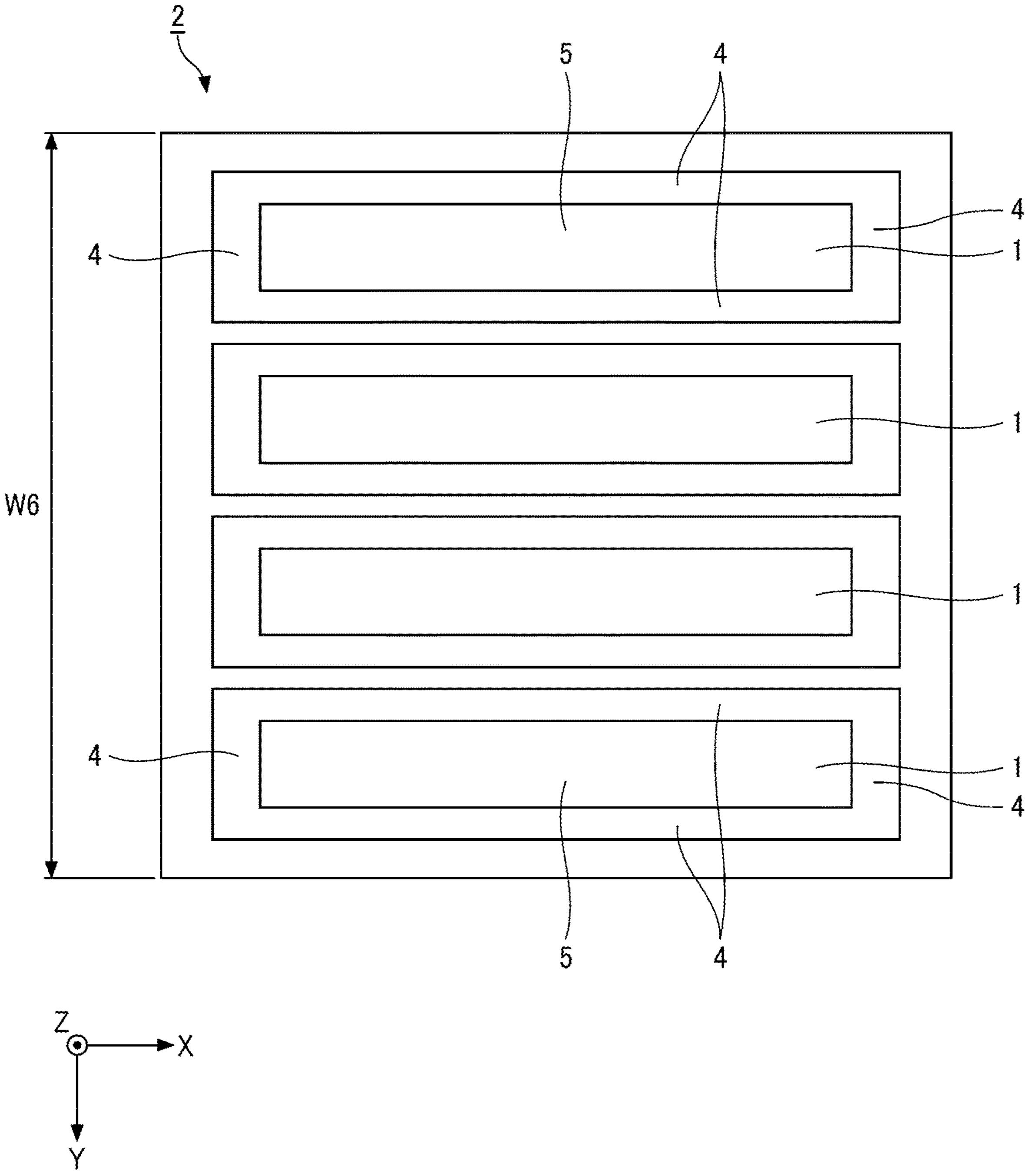
FIG. 10 is a bottom view of a liquid discharge head module according to a comparative example.

FIG. 10 is a bottom view of a head module according to a comparative example. A head module 2 according to the comparative example illustrated in FIG. 10 includes multiple discharge heads 1. The head module 2 includes a holder 6 that holds the multiple discharge heads 1. In the discharge heads 1 according to the comparative example, ribs 4 are formed so as to surround the entire perimeter of the nozzle substrate 5 when viewed in the Z-axis direction (i.e., in the XY plane). The ribs 4 are formed outside the nozzle substrate 5 in the X-axis direction and in the Y-axis direction.

The discharge head 1 according to the comparative example with the ribs 4 surrounding the entire perimeter of the nozzle substrate 5 fails to achieve its miniaturization. The width W6 in the Y-axis direction of the head module 2 according to the comparative example is wider than the width W5 of the head module 20. The head module 20 including multiple discharge heads 10 according to the present embodiment achieves miniaturization unlike the head module 2 according to the comparative example.

Liquid Discharge Apparatus According to the Fifth Embodiment

Figure 11:
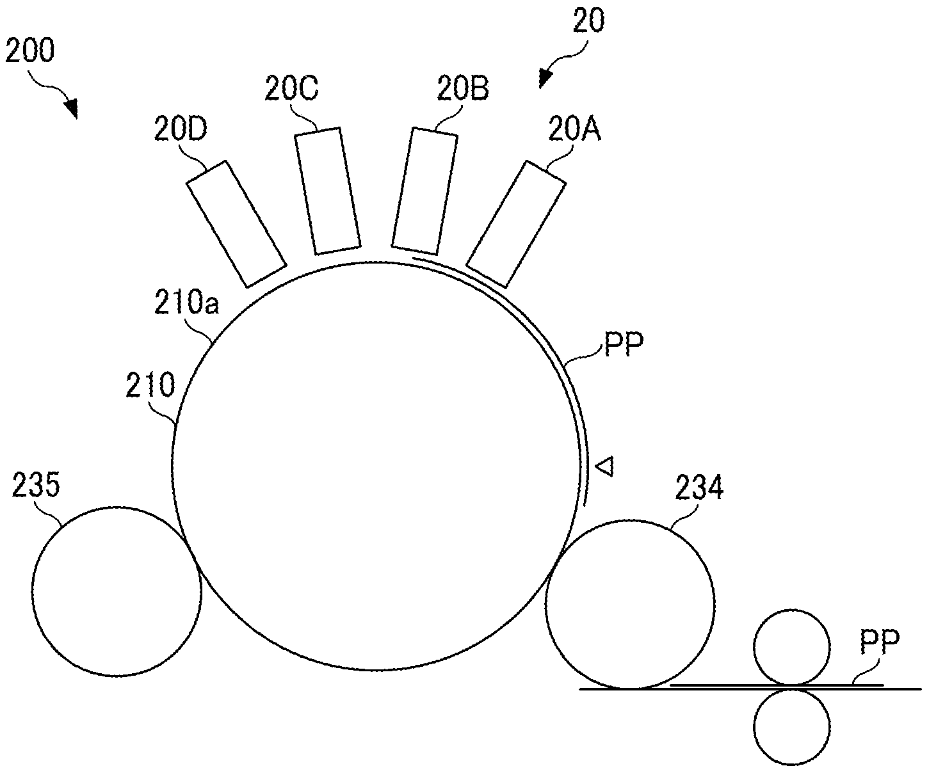
FIG. 11 is a schematic view of a liquid discharge apparatus according to a fifth embodiment.

A liquid discharge apparatus according to the fifth embodiment is described below with reference to FIG. 11. FIG. 11 is a schematic view of a liquid discharge apparatus according to the fifth embodiment of the present disclosure. The liquid discharge apparatus 200 according to the fifth embodiment includes a head module 20 including multiple discharge heads 10 according to the first embodiment. In the description of the fifth embodiment, descriptions similar to those of the first to fourth embodiments are omitted below.

The liquid discharge apparatus 200 illustrated in FIG. 11 may be, for example, an on-demand line-scanning inkjet recording apparatus. The liquid discharge apparatus 200 may be a multifunction peripheral (MFP) having a copy function, a facsimile function, a print function, or a scanner function. Alternatively, the liquid discharge apparatus 200 may have a double-sided printing function. The liquid discharge apparatus 200 may perform image formation using the electronic photography technique.

A liquid discharge apparatus includes: the liquid discharge head module according to an embodiment of the present disclosure; and a conveyor to convey a recording medium to the multiple liquid discharge heads.

The liquid discharge apparatus 200 applies ink to a recording medium PP to perform desired printing. The liquid discharge apparatus 200 includes a drum 210, a head module 20, an inlet cylinder 234, and an outlet cylinder 235. The inlet cylinder 234 supplies the recording medium PP to the drum 210. The outlet cylinder 235 ejects the recording medium PP conveyed by the drum 210. The drum 210 serves as a conveyor that conveys the recording medium PP to the liquid discharge head module.

The head module 20 includes head modules 20A, 20B, 20C, 20D, and 20E. The head modules 20A, 20B, 20C, 20D, and 20E are referred to collectively as the head modules 20 when not distinguished from each other. The head modules 20 serve as an image former that forms an image on the recording medium PP.

The head module 20A discharges ink of cyan (C). The head module 20B discharges ink of magenta (M). The head module 20C discharges ink of yellow (Y). The head module 20D discharges ink of black (K).

The head module 20E may discharge other special ink. Examples of the special ink include a white ink, a gold ink, and a silver ink.

The multiple head modules 20 are disposed along the outer circumferential surface 210*a* of the drum 210. The head modules 20 are disposed to be spaced apart from the outer circumferential surface 210*a* in the radial direction of the drum 210. The recording media PP are arranged on the outer circumferential surface 210*a* of the drum 210, and are conveyed in the circumferential direction of the drum 210 with the rotation of the drum 210.

A recording medium gripper for holding the recording medium PP is provided on the outer circumferential surface of the drum 210. Multiple suction holes are dispersedly formed on the outer circumferential surface of the drum 210. The drum 210 holds the recording medium PP on the outer circumferential surface of the drum 210 by generating a suction air current flowing from the suction holes toward the inside of the drum 210. The drum 210 rotates while holding the recording medium PP so as to convey the recording medium PP to a position facing each of the head modules 20. The recording medium PP is disposed between the outer circumferential surface of the drum 210 and the head modules 20.

Each of the head modules 20 forms an image on the surface of the recording medium PP by discharging ink onto the recording medium PP. The liquid discharge apparatus 200 ejects the recording medium PP on which an image has been formed.

The recording medium PP may be a paper medium or another medium. The recording medium PP may be a sheet material and the sheet material may be a cut sheet material. The sheet material may be an oversize sheet material such as wallpaper.

The liquid discharge apparatus 200 according to the present embodiment may be, for example, an on-demand line-scanning inkjet recording apparatus. The multiple recording heads 23 of the head modules 20 are arranged in a direction perpendicular to the direction in which the recording medium PP is conveyed. The liquid discharge apparatus 200 is applicable not only to the line-scanning ink jet recording apparatus but also to a recording apparatus using another system. Another type of recording device, for example, is a serial scanning printer that forms an image on the surface of a recording medium as the recording head moves in the main scanning direction. The main scanning direction is aligned with, for example, the X-axis direction.

The present disclosure is not limited to the above-described embodiment, and numerous additional modifications and variations are possible without departing from or changing the technical idea of the present disclosure.

Aspects of the present invention are as follows.

Aspect 1

A liquid discharge head includes a nozzle substrate having a nozzle face, the nozzle face including a nozzle from which liquid is discharged; a pressure chamber forming plate on a surface of the nozzle substrate, the surface being opposite to the nozzle face in a thickness direction of the nozzle substrate, the pressure chamber forming plate including a pressure chamber connected to the nozzle; a driver configured to change pressure of liquid in the pressure chamber; and a frame holding the pressure chamber forming plate, the frame including a rib protruding in a direction approaching the nozzle face in the thickness direction of the nozzle substrate. When viewed in the thickness direction of the nozzle substrate (in a plane orthogonal to the thickness direction of the nozzle substrate), the rib is disposed outside the nozzle substrate in a first direction or in a second direction orthogonal to the first direction, the first direction being parallel to a longitudinal direction of the nozzle substrate, the second direction being parallel to a lateral direction orthogonal to the longitudinal direction.

Aspect 2

In the liquid discharge head according to Aspect 1, when viewed in the thickness direction of the nozzle substrate (in the plane orthogonal to the thickness direction of the nozzle substrate), the rib is disposed only outside the nozzle substrate in the first direction and is continuous in the second direction.

Aspect 3

In the liquid discharge head according to Aspect 1, when viewed in the thickness direction of the nozzle substrate (in the plane orthogonal to the thickness direction of the nozzle substrate), the rib is disposed only outside the nozzle substrate in the second direction and is continuous in the first direction.

Aspect 4

In the liquid discharge head according to any one of Aspect 1 to Aspect 3, the rib protrudes toward the nozzle substrate in the thickness direction of the pressure chamber forming plate, and an end face of the rib is closer to the pressure chamber forming plate than the nozzle face.

Aspect 5

The liquid discharge head according to any one of Aspect 1 to Aspect 4, further includes a wiring board electrically connected to the driver. When viewed in the thickness direction of the nozzle substrate (in the plane orthogonal to the thickness direction of the nozzle substrate), the wiring board is disposed at a position, at which the rib is not disposed, to cover a side face of the pressure chamber forming plate.

Aspect 6

In the liquid discharge head according to any one of Aspect 1 to Aspect 5, the nozzle substrate is disposed to cover the pressure chamber, and the nozzle substrate has an outer dimension smaller than an outer dimension of the pressure chamber forming plate.

Aspect 7

In the liquid discharge head according to any one of Aspect 1 to Aspect 6, a gap is between the nozzle substrate and the rib when viewed in the thickness direction of the nozzle substrate (in the plane orthogonal to the thickness direction of the nozzle substrate).

Aspect 8

A liquid discharge head module includes multiple liquid discharge heads including the liquid discharge head according to any one of Aspect 1 to Aspect 7.

Aspect 9

A liquid discharge apparatus includes the liquid discharge head module according to Aspect 8; and a conveyor to convey a recording medium to a liquid discharge head of the multiple liquid discharge heads.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A liquid discharge head comprising:

a nozzle substrate including a nozzle, from which a liquid is discharged in a discharge direction, on a nozzle face;

a chamber forming plate disposed on a first face of the nozzle substrate and including a pressure chamber communicating with the nozzle, the first face opposite to the nozzle face in the discharge direction; and a frame configured to hold the chamber forming plate on a second face and including a rib disposed only on each end of the frame outside the nozzle substrate in a longitudinal direction of the nozzle substrate orthogonal to the discharge direction without being disposed on each end of the frame outside the nozzle substrate in a width direction of the nozzle substrate orthogonal to the discharge direction and the longitudinal direction, and a leading end of the rib protruding from the second face of the frame toward the nozzle face and not protruding from the nozzle face in the discharge direction.

2. The liquid discharge head according to claim 1, wherein the rib extends in the width direction.

3. The liquid discharge head according to claim 2, wherein the nozzle substrate covers the pressure chamber in the width direction, the nozzle substrate has an outer dimension smaller than an outer dimension of the chamber forming plate in the width direction, and the rib has a width greater than the nozzle substrate in the width direction.

4. The liquid discharge head according to claim 1, wherein the leading end of the rib is located between the first face and the nozzle face of the nozzle substrate in the discharge direction.

5. The liquid discharge head according to claim 1, further comprising a wiring board configured to cover a longitudinal side face of the chamber forming plate.

6. The liquid discharge head according to claim 1, wherein a gap is formed between the nozzle substrate and the rib in the longitudinal direction.

7. A liquid discharge head module comprising multiple liquid discharge heads including the liquid discharge head according to claim 1.

8. A liquid discharge apparatus comprising:

the liquid discharge head module according to claim 7; and a conveyor configured to convey a recording medium to the multiple liquid discharge heads.

9. A liquid discharge head comprising:

a nozzle substrate including a nozzle, from which a liquid is discharged, on a nozzle face;

a chamber forming plate disposed on a first face of the nozzle substrate and including a pressure chamber communicating with the nozzle, the first face opposite to the nozzle face in a discharge direction of the nozzle substrate; and a frame configured to hold the chamber forming plate on a second face and including a rib on each end of the frame outside the nozzle substrate in a width direction orthogonal to the discharge direction and a longitudinal direction of the frame, and a leading end of the rib protruding from the second face of the frame toward the nozzle face and not protruding from the nozzle face in the discharge direction, wherein the leading end of the rib is located between the first face and the nozzle face of the nozzle substrate in the discharge direction.

10. A liquid discharge head module comprising multiple liquid discharge heads including the liquid discharge head according to claim 9.

11. A liquid discharge apparatus comprising:

the liquid discharge head module according to claim 10; and a conveyor configured to convey a recording medium to the multiple liquid discharge heads.

12. A liquid discharge head comprising:

a nozzle substrate including a nozzle, from which a liquid is discharged in a discharge direction, on a nozzle face;

a chamber forming plate disposed on a first face of the nozzle substrate and including a pressure chamber communicating with the nozzle, the first face opposite to the nozzle face in the discharge direction; and a frame configured to hold the chamber forming plate on a second face and including a rib on each end of the frame outside the nozzle substrate in a longitudinal direction orthogonal to the discharge direction, and a leading end of the rib protruding from the second face of the frame toward the nozzle face and not protruding from the nozzle face in the discharge direction, wherein the leading end of the rib is located between the first face and the nozzle face of the nozzle substrate in the discharge direction.

13. A liquid discharge head module comprising multiple liquid discharge heads including the liquid discharge head according to claim 12.

14. A liquid discharge apparatus comprising:

the liquid discharge head module according to claim 13; and a conveyor configured to convey a recording medium to the multiple liquid discharge heads.

* * * * *